J. SQUIRES.
THREE POINT SUSPENSION FOR VEHICLE MOTORS.
APPLICATION FILED MAY 27, 1916.

1,211,637.

Patented Jan. 9, 1917.
2 SHEETS—SHEET 1.

Witness
E. R. Barrett

Inventor
John Squires.
By Pagelsen and Spencer
Attorneys

J. SQUIRES.
THREE POINT SUSPENSION FOR VEHICLE MOTORS.
APPLICATION FILED MAY 27, 1916.
1,211,637.  Patented Jan. 9, 1917.
2 SHEETS—SHEET 2.
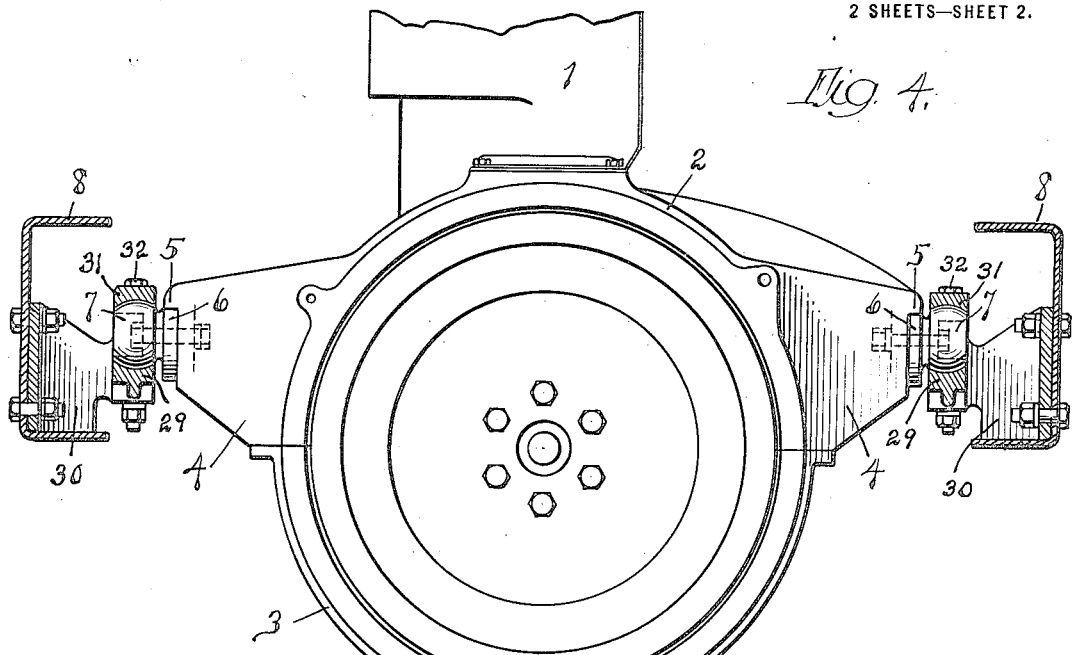
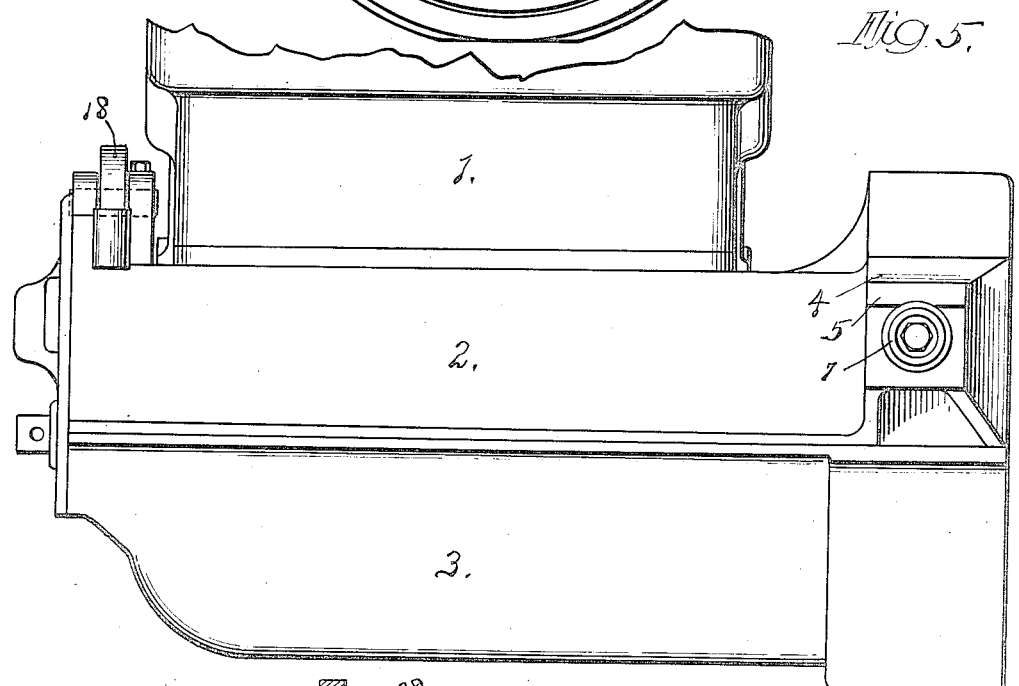
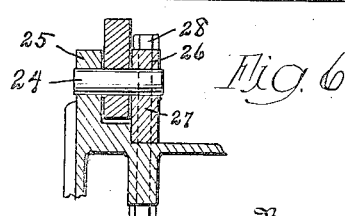

UNITED STATES PATENT OFFICE.

JOHN SQUIRES, OF DETROIT, MICHIGAN, ASSIGNOR TO SIGNAL MOTOR TRUCK COMPANY, OF DETROIT, MICHIGAN, A CORPORATION OF MICHIGAN.

THREE-POINT SUSPENSION FOR VEHICLE-MOTORS.

1,211,637.  Specification of Letters Patent.  Patented Jan. 9, 1917.

Application filed May 27, 1916. Serial No. 100,194.

*To all whom it may concern:*

Be it known that I, JOHN SQUIRES, a citizen of the United States, and residing at Detroit, in the county of Wayne and State of Michigan, have invented a new and Improved Three-Point Suspension for Vehicle-Motors, of which the following is a specification.

This invention relates to the mounting of internal combustion engines on the main frames or chassis of motor vehicles, and its object is to provide a three-point support for the engine which will transmit no twisting strains from the main frame to the engine.

This invention consists in a universal joint between each side of one end of the engine supporting device and the side bars of the vehicle frame, and a pivotal joint between the other end of the supporting device and a cross bar that extends across between these side bars.

It further consists in providing resilient supports for the ends of this cross bar.

Figure 1:
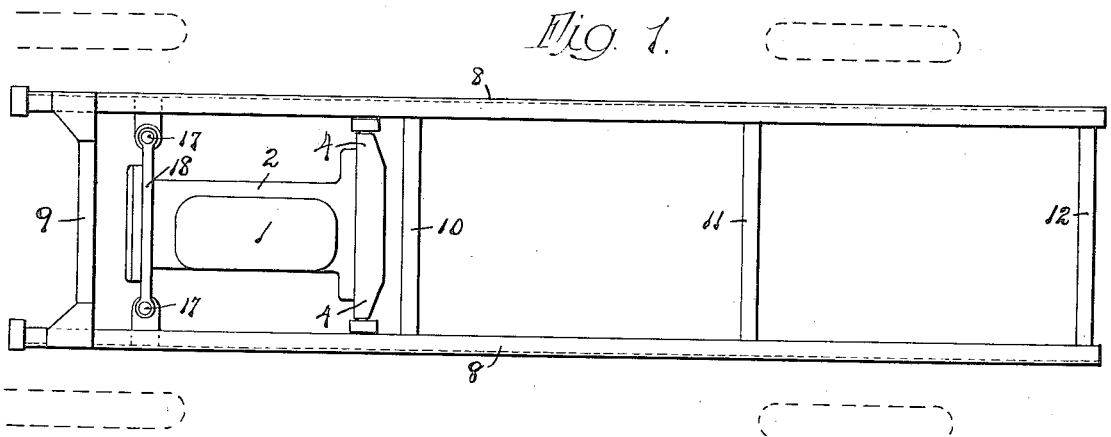
Figure 2:
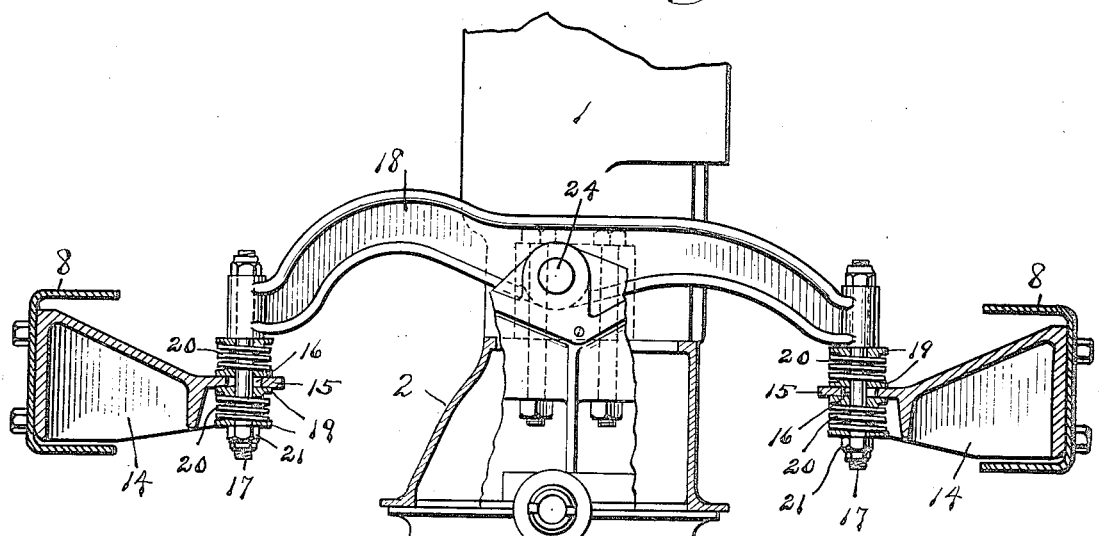
Figure 3:
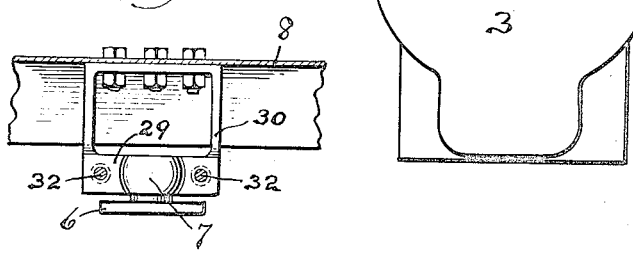

In the accompanying drawings, Figure 1 is a plan of a chassis with the engine mounted thereon. Fig. 2 is a front elevation of the support for one end of the engine. Fig. 3 is a plan of one of the brackets that support the opposite end of the engine. Fig. 4 is an elevation of that end of the engine. Fig. 5 is a side elevation thereof. Fig. 6 is a vertical longitudinal section through the support at one end of the engine.

Similar reference characters refer to like parts throughout the several views.

The twisting to which the frame or chassis of a motor vehicle, particularly a motor truck, is subjected because of the unevenness of the roadway is usually communicated to a greater or less degree to the engine carried thereby, and it often results in a distortion of the crank case that is sufficient to cause increased friction of the crank shaft in its bearings. This distortion has been partially avoided by building the crank cases very heavy, and by providing a central pivot at one end of the engine and a bearing for the pivot on one of the cross bars of the frame. The present invention not only embodies this pivot but it employs resilient connections between the ends of the cross bar and the frame and also embodies a pair of universal joints between the opposite end of the engine and the side bars of the frame of the vehicle.

In the drawings, the engine is conventionally shown with the block 1 of cylinders and the upper part 2 and the lower part 3 of the crank-case. Extensions 4, at what in the present case is the rear end of the engine, on each side have projecting flanges 5 that engage the upper flat edges of the feet 6 to which the balls 7 of universal joints are connected. These balls may be secured or connected to the engine in any other desired manner. In the following description, the crank-case 2 will be termed the "sub-frame" to indicate that the invention is not limited to any particular support for the cylinders and other operative parts of the engine.

The side bars 8 of the vehicle frame are preferably in the form of channels and are connected by any desired cross bars 9, 10, 11 and 12. Near the front ends of these side bars 8 are the inwardly extending brackets 14 having bearing webs 15 provided with holes 16 for the bolts 17 carried by the ends of the cross bar 18. Washers 19 hold the springs 20 central relative to the bolts and nuts 21 determine the initial tension of these springs.

At the front end of the engine sub-frame 2 and connected thereto in any desired manner is a swivel bearing in the form of a horizontal pin 24 that extends through the cross bar 18, preferably half way between the bolts 17. The preferred construction is shown in Fig. 6, where the pin 24 is shown to pass through the integral portion 25 of the sub-frame 2, the other part being held between the upper part 26 and the lower part 27 of a bearing secured to the sub-frame by means of bolts 28. Brackets 30 also extend inwardly from the side bars 8 and are formed with cross webs 29 having spherical depressions to receive the balls 7 and provided with caps 31 held down by bolts 32, which caps also fit these balls 7 which constitute spherical swivel bearings or universal bearings for the sub-frame. It will therefore be seen that any racking or twisting of the frame by reason of which the front end of one of the side bars goes up and of the other goes down results in these side bars turning on the axes of the balls 7, and in the compression and expansion of the springs 20. This twisting of the frame does not appreciably distort the sub-frame of the engine, which can therefore be made very tight without danger of the bearings of the crank shafts getting hot because of excessive friction.

While the pin 24 is shown to be at the front end of the engine, I do not wish to be limited to such a construction, as any other location may be chosen for this pin so long as the three points of support are arranged in a triangle. It will also be understood that the crank case of the engine is merely one embodiment of the idea of supporting the motor by means of three independent swivels, and that the engine and its base may be constructed in any other desired manner.

I claim:—

1. In a vehicle, the combination of a main frame and a cross bar, springs carried by said main frame for positioning the ends of said cross bar, an engine sub-frame positioned adjacent the main frame, a longitudinal pin connecting one end of the sub-frame to said cross bar, and a pair of universal joints connecting the opposite end of the sub-frame to the main frame.

2. In a vehicle, the combination of a main frame, a sub-frame, an internal combustion engine, a cross bar resiliently mounted on the main frame and provided with a horizontal pivot intermediate its ends, sockets mounted on the side-bars opposite each other, said sub-frame having one end mounted on the said pivot, and balls secured to the sub-frame and resting in said sockets to support the sub-frame and permit the members of the main frame to assume new positions without excessively stressing the sub-frame.

3. In a vehicle, the combination of a main frame and a cross bar, a pin extending downward from each end of the cross bar, a bracket secured to each side of the frame and provided with a hole through which the pin extends, a spring on each pin between the bracket and cross bar, a spring on each pin below the bracket, a nut and washer on each pin to tension the springs, an engine positioned adjacent the cross bar, a longitudinal pin carried by one end of the engine and extending into a bearing on the cross bar, and means to connect the opposite end of the engine to the main frame.

JOHN SQUIRES.